United States Patent [19]

Marten

[11] Patent Number: 4,529,775
[45] Date of Patent: Jul. 16, 1985

[54] METHOD FOR INCREASING THE LOW TEMPERATURE WATER SOLUBILITY AND THE STICKING TEMPERATURE OF FULLY HYDROLYZED POLYVINYL ALCOHOL

[75] Inventor: Finn L. Marten, Macungie, Pa.

[73] Assignee: Air Products and Chemicals, Inc., Allentown, Pa.

[21] Appl. No.: 538,257

[22] Filed: Oct. 3, 1983

[51] Int. Cl.³ .................. C08F 16/06; C08G 18/00
[52] U.S. Cl. ................................. 525/62; 528/496; 528/503; 528/491; 528/499; 528/502
[58] Field of Search ............... 528/496, 503; 525/62

[56] References Cited

U.S. PATENT DOCUMENTS 3,156,678  11/1964  Dexheimer et al. .
3,278,505  10/1966  Kominami ........................ 525/62
3,497,487   2/1970  Bristol .
3,654,247   4/1972  Bristol ............................ 528/496

FOREIGN PATENT DOCUMENTS 795385  9/1968  Canada .

Primary Examiner—Paul R. Michl
Assistant Examiner—S. Babajko
Attorney, Agent, or Firm—Michael Leach; James C. Simmons; E. Eugene Innis

[57] ABSTRACT

A method is provided for reducing the solvent content and increasing the sticking temperature of polyvinyl alcohol, which is prepared from the alcoholysis of polyvinyl acetate, charged to a dryer. The polyvinyl alcohol from the alcoholysis reaction, without prior vacuum drying at an elevated temperature, is slurried in a liquid medium comprising methanol, methyl acetate, water and, optionally, a nonsolvent for polyvinyl alcohol. The slurry is heated to at least 60° C. for at least 5 minutes. The polyvinyl alcohol burnt particle count is reduced in the subsequent drying step and a product is afforded which has a reduced ash content and increased cold water solubility and low temperature solubility.

17 Claims, No Drawings

METHOD FOR INCREASING THE LOW TEMPERATURE WATER SOLUBILITY AND THE STICKING TEMPERATURE OF FULLY HYDROLYZED POLYVINYL ALCOHOL

TECHNICAL FIELD

The invention relates to a process for the alcoholysis of polyvinyl acetate to afford a fully hydrolyzed polyvinyl alcohol product. More particularly, the invention relates to a process for the slurry treatment of alcoholyzed polyvinyl acetate.

BACKGROUND OF THE INVENTION

Polyvinyl alcohol (PVOH) is generally prepared by the alcoholysis or saponification of a polyvinyl ester, usually polyvinyl acetate. The conversion of the polyvinyl ester to polyvinyl alcohol is typically effected in methanol in the presence of an alcoholysis catalyst such as sodium hydroxide or sodium methylate. The products of this reaction are the desired polyvinyl alcohol and methyl acetate.

While the polyvinyl acetate is completely soluble in the methanol, the resulting polyvinyl alcohol is less soluble in the mixture of unreacted methanol and by-product methyl acetate. The fully alcoholyzed, or hydrolyzed, (93 to 100%) polyvinyl alcohol is often obtained from the reaction in the form of a slab of rubbery gel which still contains a large amount of solvent. This polyvinyl alcohol slab is cut up into small particles and placed in a slurry tank along with a liquid medium which is 60 to 65% methanol and 35 to 40% methyl acetate. The resulting slurry is held at about 110° to 120° F. (43°–49° C.) for a period of 15 to 30 minutes in order to remove residual catalyst and sodium acetate.

The polyvinyl alcohol solids are then separated from the slurry mother liquor in a centrifuge followed by drying in a heated dryer until a solids content of about 98% is attained.

The use of dryers by the industry to reduce the solvent level in the virgin polyvinyl alcohol has several disadvantages. It is virtually impossible to increase the production rate without increasing the dryer temperature or enlarging the dryer. Increased dryer temperature is detrimental since it tends to affect adversely polyvinyl alcohol properties such as solubility, color and burnt particle content.

Burnt particles of polyvinyl alcohol result from the particles sticking to the heated walls of the dryer and decomposing. This sticking characteristic of the polyvinyl alcohol particles is dependent upon the temperature of the dryer walls and the polyvinyl alcohol composition. The temperature at which the particles stick to the walls is termed the sticking temperature. Currently, the only method to avoid burnt particles is to lower the drying temperature. But this action lowers production rate. The problem is to increase the sticking temperature of the polyvinyl alcohol particles thereby reducing the burnt particle count without lowering the drying temperature or reducing production rate.

Another problem is to raise the sticking temperature of the polyvinyl alcohol without decreasing its cold water solubility and/or its low temperature water solubility. The ideal solution to the problem would be to increase the sticking temperature while increasing the cold water solubility and the low temperature water solubility. Cold water solubility is the solubility of dry polyvinyl alcohol in water @25° C. Low temperature water solubility is the solubility of dry polyvinyl alcohol in water @60° C. Increasing the cold water solubility and the low temperature water solubility is important because it allows polyvinyl alcohol users to obtain full solubility at temperatures lower than 90°–95° C. thus affording a savings in energy.

U.S. Pat. No. 3,156,678 discloses the alcoholysis of polyvinyl acetate in a solvent system containing methanol and methyl acetate.

U.S. Pat. No. 3,497,487 discloses that the water slurrying properties of particulate polyvinyl alcohols which are at least 70% alcoholyzed are improved by heating a slurry of the polyvinyl alcohol in a liquid medium which is a 2 to 20% solution of acetic acid in a solvent comprising methanol, methyl acetate, or a mixture of methanol and methyl acetate, then separating the polyvinyl alcohol from the liquid medium.

U.S. Pat. No. 3,654,247 discloses the cold water solubles content and/or the cold water imbibing tendency of a 93 to 100% alcoholyzed polyvinyl alcohol are reduced by heating at a temperature of 70° to 190° C. a dispersion of the polyvinyl alcohol in a liquid solvent comprising 30 to 100% methanol, 0 to 13% water and 0 to 45% of a $C_2$–$C_5$ monohydric alcohol, methyl acetate, acetone, ethylene glycol, dimethyl ether, toluene, methylene chloride, or the like. The examples show that the polyvinyl alcohols prepared by the alcoholysis of polyvinyl acetate were vacuum dried at about 80° C. prior to the heat treatment of the polyvinyl alcohol dispersion.

Canadian Pat. No. 795,385 discloses polyvinyl alcohol having a low swelling degree, little discoloration and no lumps is prepared by adding 5 to 15 wt % water to polyvinyl alcohol after saponification and before drying the composite by heating. The water could also be added in admixture with methanol and/or methyl acetate to avoid lumping.

SUMMARY OF THE INVENTION

The invention provides a method for reducing the solvent content in the wet fully alcoholyzed (93–100 mole %) polyvinyl alcohol from the alcoholysis of polyvinyl acetate which is charged to a dryer and thus increasing the production rate of polyvinyl alcohol as well as increasing the cold water and low temperature water solubility of the dried resin product.

The method of the invention for reducing the solvent level in the polyvinyl alcohol prior to the drying step comprises (1) providing a slurry vessel with wet polyvinyl alcohol particles from an alcoholysis reaction and a liquid slurry medium comprising 40 to 70 wt % methanol, 30 to 60 wt % methyl acetate, 0 to 10 wt % water and, optionally 0 to 30 wt % of a nonsolvent for polyvinyl alcohol, and (2) heating the resultant slurry for about 5 to 90 minutes at a temperature of about 60° to 120° C.

The method is applicable to a process for the preparation of fully alcoholyzed (93–100%) polyvinyl alcohol which comprises (a) alcoholyzing polyvinyl acetate dissolved in a methanol medium to afford 93–100% alcoholyzed polyvinyl alcohol as a wet, insoluble gelled product, (b) cutting the wet, gelled product into small particles, (c) slurrying the polyvinyl alcohol particles in a methanol/methyl acetate slurry medium and heating the slurry, (d) separating the slurry into a mother liquor and heat-treated polyvinyl alcohol particles, and (e) drying the particles until a solids content of about 98% is attained.

Practicing the method of the invention lowers the degree of swelling, i.e. reduces the amount of methanol and methyl acetate contained in the polyvinyl alcohol particles, and thus increases the solids level of the wet polyvinyl alcohol particles going to the dryer. This provides the advantage of increasing the production rate by increasing the amount of polyvinyl alcohol that can be processed in the dryer. It is also possible to reduce the temperature in the dryer because of the reduced amount of solvent in the wet PVOH that has to be driven off thus resulting in energy savings, As another advantage the sticking temperature of the polyvinyl alcohol, which is the major cause of burnt particles, is increased. As the slurry treatment temperature is increased and the water concentration in the slurry medium decreased in the designated ranges, the sticking temperature increases. In addition, a reduced ash content (measured as $Na_2O$) is realized in the product. Thus, a polyvinyl alcohol product having a decreased burnt particle and ash content can be obtained which product is suitable for extrusion without developing severe discoloration.

A still further advantage of the process is the increase in the cold water solubility and the low temperature water solubility of the polyvinyl alcohol product. Also the temperature at which the polyvinyl alcohol is totally soluble in water is lowered thus facilitating the ease and lowering the energy needed to dissolve the polyvinyl alcohol product.

DETAILED DESCRIPTION OF THE INVENTION

The overall process begins with preparing a solution of polyvinyl acetate in methanol. Generally, the polyvinyl acetate solution in methanol should have a polymer content of at least 25 wt %, for example 25 to 70 wt %, the most preferred concentrations being 30 to 45 wt % for medium viscosity grade (degree of polymerization of about 1700).

Although both acidic and alkaline materials may be employed to catalyze the methanolysis reaction, alkaline catalysts are generally preferred over acid catalysts because they result in a more rapid alcoholysis. Examples of suitable alkaline catalysts are the alkali metal hydroxides and alkoxides. Of the alkali metal alkoxides, socium methoxide is the most preferred.

Temperatures of the alcoholysis reaction are generally maintained between 45° and 60° C. with pressures between 1 and 2 atm. The alcoholysis is performed for a period of time sufficient to yield a fully alcoholyzed (93–100%) polyvinyl alcohol product, typically 5 to 20 minutes.

The products of the reaction are a fully alcoholyzed polyvinyl alcohol and methyl acetate. Since the resulting polyvinyl alcohol is less soluble in the mixture of methyl acetate and methanol, the polyvinyl alcohol product separates from the reaction medium in the form of a rubbery gel. In the continuous alcoholysis of polyvinyl acetate, a polyvinyl acetate feed solution in methanol is continually added to the reaction vessel as a product stream is withdrawn.

The product stream that is withdrawn from the reaction vessel comprises a slab of rubbery gel still containing a large amount of alcoholysis solvent, i.e. the polyvinyl alcohol is "wet". Using a wet cutter, the slab is then cut up into small particles having a size generally in the range of $\frac{1}{8}$ to $\frac{1}{2}$ inch and containing 60 to 70 wt % solvent. Contrary to the teaching in U.S. Pat. No. 3,645,247, the wet polyvinyl alcohol particles are not dried in vacuum at temperatures above 50° C. in the process of this invention. Rather, the wet polyvinyl alcohol particles are introduced without vacuum drying at elevated temperatures into a slurry tank along with a slurry medium comprising methanol, methyl acetate and water. Typically, the slurry should contain 7–10 wt % polyvinyl alcohol. The slurry medium comprises 40 to 70 wt % methanol, 30 to 60 wt % methyl acetate and 0 to 10 wt % water with preferred wt % ranges being 55 to 70% methanol, 30 to 45% methyl acetate and less than 5% water, especially 1 to 3% water. Desirably, the slurry medium comprises essentially the same methanol/methyl acetate/water composition existing in the alcoholysis vessel, i.e. the alcoholysis medium, and is obtained by the separation of the alcoholysis medium from the rubbery gelled polyvinyl alcohol in the cutting operation.

The slurry is maintained at a temperature greater than 60° C., preferably 80° to 110° C. for about 10 to 30 minutes. Slurry heat treatment at higher temperatures of about 95° to 105° C. result in a higher solids level of wet polyvinyl alcohol upon separation of the polymer from the slurry medium and also provide a polymer with higher sticking temperatures when the water content of the slurry medium is less than 5% and preferably about 1 to 3%.

The polyvinyl alcohol particles are generally separated from the slurry medium in a centrifuge to provide particles wet with slurry medium for the drying operation. Whereas such wet polyvinyl alcohol particles normally comprised about 30wt % polyvinyl alcohol and 70% slurry medium when the slurry heat treatment was performed at about 50° C. in the conventional process, the wet polyvinyl alcohol particles may now contain as high as 60 wt % solids, a result of the higher temperature used in the slurry heat treatment step.

Without being held to any particular theory, it is believed that the increase in temperature in the slurry tank provides an increase in the crystallinity of the polyvinyl alcohol polymer resulting in a "squeezing out" of the slurry medium solvents. Therefore a wet product comprising a higher percentage of polyvinyl alcohol solids is provided to the drying operation. Accordingly, by operating the dryer at the conventional temperature a higher throughput of product can be handled or the dryer temperature can be lowered to maintain the same product throughput, or a combination of both advantages can be had.

The drying operation involves the use of a dryer conventional to those skilled in the art, preferably a rotary dryer which is heated to about 125° to 175° C. to drive off the solvent providing a product which is at least 98% solids.

EXAMPLES

In Runs 1–9 100 g of wet polyvinyl alcohol (37.3% solids, 98% alcoholyzed) of $\frac{1}{4}$ inch particle size, without previously being dried under vacuum as taught in U.S. Pat. No. 3,654,247, was placed in a pressure reactor equipped with a stirrer. The slurry treatment liquid (440 g) shown in Table 1 was added and the slurry was heated to the temperature for the time shown in Table 1. After the slurry heat treatment period the reactor was cooled and the contents were filtered. The filtration was discontinued when the filtrate flow changed to a dripping. This change to dripping always occurred within 2 minutes. The filter cake was removed and shaken in a closed container before samples were weighed. The solids level was taken as an average of at least 2 determinations.

DETERMINATION OF STICKING TEMPERATURE

The wet polyvinyl alcohol was placed on a hot bench for 1 minute. The sticking temperature was taken as the temperature at which the first major polyvinyl alcohol particle stuck. The non-sticking polyvinyl alcohol was brushed off using a 1" brush in a light sweeping action.

DETERMINATION OF LOW TEMPERATURE WATER SOLUBILITY

Polyvinyl alcohol (15 g) dried at 100° C. was added rapidly to 135 g stirred, distilled water (135 ml) at a temperature of 60° C. The amount of polyvinyl alcohol in solution at a given time was determined by means of the refractive index of the solution. Measurements were taken with 1, 2 and 5 minute intervals. The last measurement was taken after 30 minutes.

DETERMINATION OF DRYING TIME

Wet polyvinyl alcohol as placed on a preweighed dish in an oven at a drying temperature of 100° C. Every 15 minutes the dish of polyvinyl alcohol was removed and weighed. The time out of the oven was less than 1 minute for each weighing.

The drying times to 98% solids at 100° C. for Runs 3–8 indicated that higher solids level leads to a faster drying time. The long drying times in Runs 1 and 2 were probably due to the lower slurry temperature and the higher water content (9.1%) of the slurry medium.

The sticking temperature of the higher water (9.1%) treated materials was significantly lower than that for the lower water content materials. In addition, slurry treatment at 100° afforded a higher sticking temperature than that of the same slurry medium composition at 80° C.

With regard to limiting solubilities of the polyvinyl alcohol particles at 60° C. in water. Runs 1 through 8 demonstrated an improvement over that of untreated polyvinyl alcohol.

EXAMPLE 2

In Runs 10–19 the wet polyvinyl alcohol particles were suspended in various slurry media containing various amounts of methyl acetate, methanol and water at room temperature for 24 hours.

TABLE 2

| RUN | MeOH | MeAc | H$_2$O | SOLIDS % | ASH % |
|---|---|---|---|---|---|
| 10 | 0 | 100 | 0 | 51.6 | 0.99 |
| 11 | 50 | 50 | 0 | 45.8 | 0.29 |
| 12 | 100 | 0 | 0 | 37.3 | 0.10 |
| 13 | 0 | 99 | 1 | 80.5 | 1.46 |
| 14 | 49.5 | 49.5 | 1 | 44.7 | 0.12 |
| 15 | 99.0 | 0 | 1 | 36.7 | 0.07 |
| 16 | 0 | 97.5 | 3 | 85.2 | 1.19 |
| 17 | 48.5 | 48.5 | 3 | 44.5 | 0.13 |
| 18 | 97.0 | 0 | 3 | 35.6 | 0.07 |
| 19 | UNTREATED PVOH | | | 39.8 | 1.3 |

TABLE 1

| RUN | SLURRY TREATMENT °C. | HR | Wt. % MeOH | MeAc | H$_2$O | Average Sticking Temperature °C. | Before Drying Solids % | Ash* % | Drying Time To 98% Solids Min | Limiting Low Temp. Solubility % |
|---|---|---|---|---|---|---|---|---|---|---|
| 1 | 80 | 0.5 | 58.4 | 32.5 | 9.1 | 173 | 48.1 | 0.15 | 101 | 81.9 |
| 2 | 80 | 1.5 | 58.4 | 32.5 | 9.1 | 170 | 48.6 | 0.13 | 101 | 79.0 |
| 3 | 80 | 0.5 | 63.5 | 35.4 | 1.1 | 189 | 45.4 | 0.18 | 85 | 80.1 |
| 4 | 80 | 1.5 | 63.5 | 35.4 | 1.1 | 190 | 48.2 | 0.17 | 85 | 77.8 |
| 5 | 100 | 0.5 | 58.4 | 32.5 | 9.1 | 187 | 51.7 | 0.11 | 87 | 77.2 |
| 6 | 100 | 1.5 | 58.4 | 32.5 | 9.1 | 172 | 50.8 | 0.16 | 87 | 73.6 |
| 7 | 100 | 0.5 | 63.5 | 35.4 | 1.1 | 198 | 49.9 | 0.15 | 87 | 76.0 |
| 8 | 100 | 1.5 | 63.5 | 35.4 | 1.1 | 197 | 49.5 | 0.16 | 87 | 72.4 |
| 9 | UNTREATED PVOH | | | | | 172 | 37.5 | 1.2 | 96 | 71.8 |

*% Ash in PVOH

Two sets of slurry solvent compositions are shown in Table 1. The composition containing 63.5% methanol. 35.4% methyl acetate and 1.1% water approximated the mother liquor normally produced in an industrial alcoholysis operation. The composition containing 9.1% water had the same ratio of methanol to ester as the mother liquor but represented the addition of more water. Slurry medium which contained more water afforded a polymer product (before drying) having a slightly higher solids content and a slightly lower ash content. The data clearly show that the solids level after filtration was a function of temperature. An increase in solids level from 37.5 to about 50.3 could decrease the BTU demand in the dryer by a factor of about 1.7 resulting in a substantial energy savings.

The ash level was decreased significantly by treating the polyvinyl alcohol at a temperature above the conventional 50° C. in the slurry tank. However, the resulting ash level seemed to be independent of the temperature and slurry medium used in the range investigated.

The data show an increase in solids as the methyl acetate and water levels were increased. The ash level in the polyvinyl alcohol product decreased with increasing methanol level since the solubility of sodium acetate is higher in methanol than in methyl acetate. However, not shown in Table 2 is the unexpected finding that the visual color of the dried polyvinyl alcohol decreased as the methyl acetate level increased. This is contrary to the belief that ash acts as a catalyst for color development.

It should be noted that the solids level of the filtered or centrifuged polyvinyl alcohol can be increased as in the case with methyl acetate by adding a nonsolvent for the polyvinyl alcohol to the slurry medium. The requirement is, however, that methanol is miscible with the nonsolvent liquid. Among the nonsolvent liquids which may be used are higher alcohols, ketones and hydrocarbons such as benzene or toluene. Such nonsolvents may be added in an amount ranging from 0 to 30 wt % of the solvent medium.

EXAMPLE 3

In this example, the treatment of wet 98% alcoholyzed polyvinyl alcohol samples according to the present invention and according to U.S. Pat. No. 3,654,247 was compared. The '247 sample was prepared according to the procedure of Example 1 of the patent which includes washing the wet resin with three portions of methyl acetate and vacuum drying at 80° C.

The wet polyvinyl alcohol samples (29.1 wt % solids) and the dried '247 sample (100 wt % solids) were then slurried in a medium comprising methanol, methyl acetate and water in a 63.5:35.4:1.1 wt % ratio and maintained at 100° C. for 0.5 hr. The samples were filtered from the slurry medium and dried at 100° C. Table 3 shows the solids content of the wet, filtered samples before drying, the ash content and low temperature water solubility after drying (45 min) for the two samples.

TABLE 3

| SAMPLE | SOLIDS wt % | ASH wt % | LOW TEMP SOLUBILITY wt % |
|---|---|---|---|
| Present Invention | 43.8 | 0.14 | 73.6 |
| U.S. Pat. No. 3,654,247 | 62.7 | 0.13 | 71.2 |

It can be seen that the present method increased the solids level of the wet resin to the final dryer from 29.1% to 43.8% in contrast to the '247 method in which the 100% solids prior to the slurry treatment afforded a 62.7% wet resin to the dryer. In addition, Table 4 shows the increase in the low temperature water solubility which can be achieved in conjunction with energy saving from being able to drop the drying temperature from 140° C. for untreated wet polyvinyl alcohol to 120° C. or 100° C. for slurry treated material.

TABLE 4

| | SOLUBILITY AT 60° C. | | | |
|---|---|---|---|---|
| MIN. | UNTREATED, VACUUM DRIED AT 80° C. | SLURRY TREATED DRIED AT 100° C. | SLURRY TREATED DRIED AT 120° C. | UNTREATED DRIED AT 140° C. |
| | % Solids in Solution | | | |
| 1 | 12.0 | 1.2 | — | 0.6 |
| 3 | 26.3 | 10.8 | 8.3 | 6.0 |
| 5 | 36.4 | 19.1 | 23.6 | 9.6 |
| 10 | 57.7 | 34.2 | 39.0 | 16.0 |
| 15 | 74.8 | 44.2 | 47.4 | 19.8 |
| 20 | 83.1 | 52.5 | 56.4 | 21.7 |
| 25 | 85.5 | 59.5 | 57.6 | 24.3 |
| 30 | 90.4 | 64.3 | 57.6 | 24.3 |
| 35 | 91.0 | 65.9 | 64.6 | 26.9 |
| 40 | 93.4 | 67.0 | 67.2 | 28.2 |
| 45 | 94.5 | 73.6 | 69.6 | 28.8 |

The data show the 60° water solubility for untreated resin dried at 140° C. was 28.8% compared to 69.6% and 73.6% for slurry treated resin dried at 120° C. and 100° C., respectively. The solubility of the 80° C. vacuum dried sample was 94.5%.

Furthermore the cold water (25° C.) solubility for the untreated, 140° C. dried polyvinyl alcohol was 0.7% and for the slurry treated, 120° C. dried resin was 3.7%.

Thus by using the present invention in a polyvinyl alcohol process from polyvinyl acetate, the drying temperature can be reduced for a significant energy savings with less burnt particles while the cold water and low temperature water solubility of the resin product is increased.

STATEMENT OF INDUSTRIAL APPLICATION

The method of the invention when incorporated into an industrial process for preparing polyvinyl alcohol by the methanolysis of polyvinyl acetate provides energy saving in the overall process as well as a polyvinyl alcohol product having less burnt particles, improved water solubility and reduced ash content.

I claim:

1. A method for reducing the solvent content and increasing the sticking temperature and the low temperature water solubility of fully alcoholyzed polyvinyl alcohol prepared by the alcoholysis of polyvinyl acetate which comprises (a) generating a slurry by mixing wet, 93–100 mole % alcoholyzed polyvinyl alcohol from an alcoholysis of polyvinyl acetate prior to a drying step and a liquid slurry medium comprising 40 to 70 wt % methanol, 30 to 60 wt % methyl acetate, 0 to 10 wt % water and 0 to 10 wt % water and 0 to 30 wt % of a nonsolvent for polyvinyl alcohol which is miscible with methanol, and (b) heating the slurry for about 10 to 90 minutes at a temperature from about 60° to 120° C.

2. The method of claim 1 in which the slurry is heated to a temperature from 80° to 110° C.

3. The method of claim 2 in which the slurry medium comprises 55 to 70 wt % methanol, 30 to 45 wt % methyl acetate and less than 5 wt % water.

4. The method of claim 3 in which the water content is 1 to 3 wt %.

5. The method of claim 4 in which the slurry is heated for 10 to 30 minutes.

6. The method of claim 5 in which the slurry medium comprises essentially the same methanol/methyl acetate/water composition as the methanol-containing alcoholysis medium.

7. In a process for the preparation of fully alcoholyzed polyvinyl alcohol which comprises (a) alcoholyzing polyvinyl acetate dissolved in a methanol-containing medium to afford 93–100 mole % alcoholyzed polyvinyl alcohol, (b) slurrying the polyvinyl alcohol in a methanol/methyl acetate-containing slurry medium and heating the slurry to an elevated temperature, (c) separating the slurry mother liquor and polyvinyl alcohol wet with slurry mother liquor, and (d) drying the wet polyvinyl alcohol, the improvement for reducing the mother liquor content and increasing the sticking temperature of the polyvinyl alcohol subjected to drying step (d) which then yields a fully alcoholyzed polyvinyl alcohol having increased low temperature water solubility which improvement in step (b) comprises
  (1) making a slurry of the polyvinyl alcohol from step (a) in a liquid slurry medium comprising 40 to 70 wt % methanol, 30 to 60 wt % methyl acetate, 0 to 10 wt % water and 0 to 30 wt % of a nonsolvent for polyvinyl alcohol which is miscible with methanol without previously drying the polyvinyl alcohol, and
  (2) heating the slurry for about 10 to 90 minutes at a temperature from about 60° to 20° C.

8. The method of claim 7 in which the slurry is heated to a temperature from 80° to 110° C.

9. The method of claim 8 in which the slurry medium comprises 55 to 70 wt % methanol, 30 to 45 wt % methyl acetate and less than 5 wt % water.

10. The method of claim 9 in which the water content is 1 to 3 wt %.

11. The method of claim 9 in which the slurry is heated for 10 to 30 minutes.

12. The method of claim 11 in which the slurry medium comprises essentially the same methanol/methyl acetate/water composition as the methanol-containing alcoholysis medium.

13. In a process for the preparation of fully alcoholyzed polyvinyl alcohol which comprises
  (a) alcoholyzing polyvinyl acetate dissolved in a methanol medium to afford 93–100 mole % alcoholyzed polyvinyl alcohol as a gelled product,
  (b) cutting the gelled polyvinyl alcohol into small particles,
  (c) slurrying the particles of polyvinyl alcohol in a methanol/methyl acetate slurry medium and heating the slurry to an elevated temperature.
  (d) separating the slurry into a mother liquor and polyvinyl alcohol particles wet with mother liquor, and
  (e) drying the polyvinyl alcohol particles until a solids content of about 98% is attained, the improvement for reducing the mother liquor content and increasing the sticking temperature of the wet polyvinyl alcohol particles subjected to drying step (e) which then yields a fully alcoholyzed polyvinyl alcohol having increased low temperature water solubility which improvement in step (c) comprises
  (1) slurrying the polyvinyl alcohol particles from step (b), without previously drying the particles, in a liquid medium comprising 55 to 70 wt % methanol, 30 to 45 wt % methyl acetate and less than 5 wt % water, and
  (2) heating the slurry for about 10 to 30 minutes at a temperature from about 80° to 110° C.

14. The method of claim 13 in which the slurry is heated to a temperature from 95° to 105° C.

15. The method of claim 14 in which the water content is 1 to 3 wt %.

16. The method of claim 15 in which the slurry medium comprises essentially the same methanol/methyl acetate/water composition as the methanol-containing alcoholysis medium.

17. The method of claim 13 in which the slurry medium also contains 0 to 30 wt % of a nonsolvent for polyvinyl alcohol which is miscible with methanol.

* * * * *

UNITED STATES PATENT AND TRADEMARK OFFICE
CERTIFICATE OF CORRECTION

PATENT NO. : 4,529,775

DATED : 16 July 1985

INVENTOR(S) : Finn L. Marten

It is certified that error appears in the above-identified patent and that said Letters Patent is hereby corrected as shown below:

In Column 8, Line 20 should read:

"% water and 0 to 30 wt %"

In Column 9, Line 11 should read:

"temperature from about 60 to 120° C."

Signed and Sealed this

Twentieth Day of May 1986

[SEAL]

Attest:

DONALD J. QUIGG

Attesting Officer

Commissioner of Patents and Trademarks